United States Patent [19]

Bowmen

[11] 3,996,676

[45] Dec. 14, 1976

[54] STELLADISK

[76] Inventor: Mary Teresa Bowmen, 500 Fifth Ave., Apt. 36, Nashville, Tenn. 37219

[22] Filed: June 17, 1975

[21] Appl. No.: 587,646

[52] U.S. Cl. ................................................. 35/44
[51] Int. Cl.² ........................................ G09B 29/00
[58] Field of Search .................. 273/161; 35/43, 44

[56] References Cited

UNITED STATES PATENTS

| 515,195 | 2/1894 | Cowell | 35/44 |
|---|---|---|---|
| 573,091 | 12/1896 | Lindahl | 35/44 |
| 1,301,046 | 4/1919 | Everson | 35/43 |
| 1,502,761 | 7/1924 | Bart | 35/44 |
| 2,219,378 | 10/1940 | Booth | 35/44 |
| 2,527,777 | 10/1950 | Terry | 35/44 |

FOREIGN PATENTS OR APPLICATIONS 13,748 8/1891 United Kingdom .................. 35/44

*Primary Examiner*—Anton O. Oechsle

[57] ABSTRACT

A device for erecting horoscopes comprising a base disk divided into 12 zodiac house areas, V-shaped slots disposed in circular arrays about the center of the disk, and a plurality of planetary designated disks having V-shaped shanks extending from their rear surfaces for insertion in the slots of the base disk. A house number disk is locatable centrally of the base disk. A second, transparent base disk can be mounted over the first base disk for comparison of two erected horoscopes. A plurality of unprinted self-adhesive labels may be provided for selective disposition on the planetary disks.

4 Claims, 4 Drawing Figures

U.S. Patent
Dec. 14, 1976
3,996,676
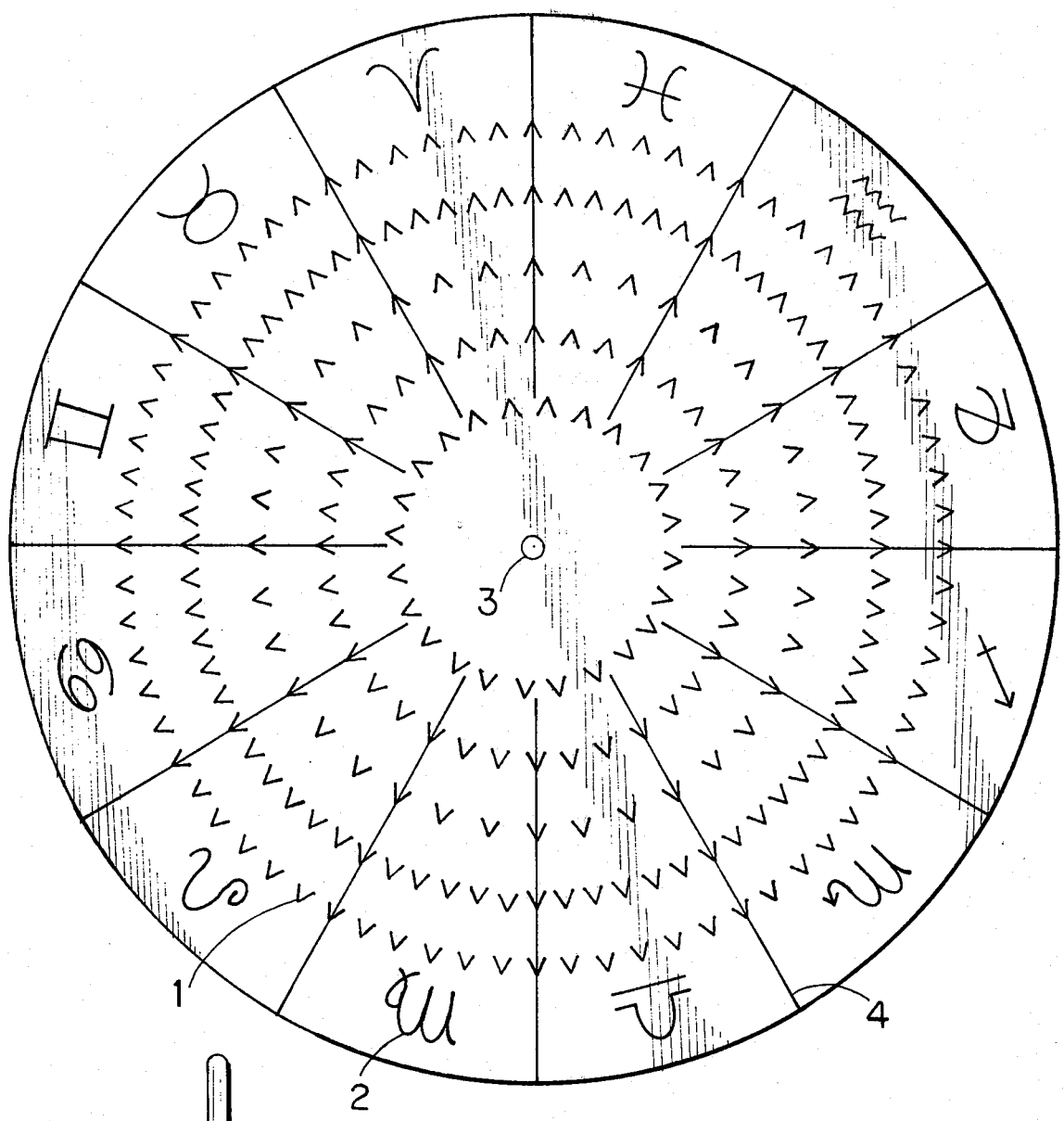
FIG.1.
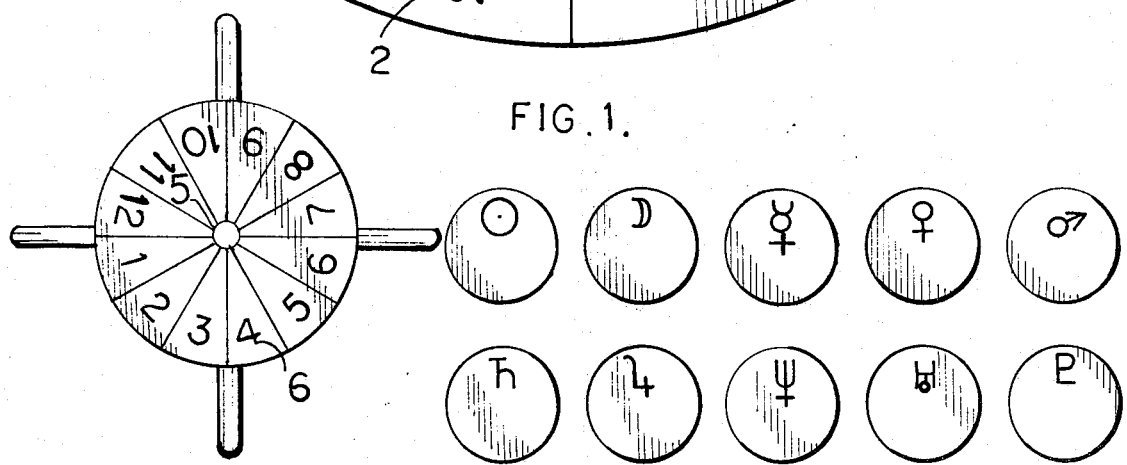
FIG.2.
FIG.3.

STELLADISK

The Stelladisk is a device for erecting a durable and readily-accessible horoscope consisting of a structure containing a diagram of the zodiac and movable parts, representing the planets and luminaries, which are affixable thereto.

The study and practice of astrology requires much comparing of horoscopes, e.g., the natal horoscope is compared with the daily horoscope, the progressed horoscope, the horoscope of an upcoming event, or the horoscope of another person or city, to mention but a few types of horoscope comparisons. It is convenient, therefore, to have a durable horoscope at hand for analysis and comparison. By means of the Stelladisk one or more horoscopes can be erected and kept on hand at all times.

Horoscope comparison is not only a serious study, but to many it is in the nature of an enjoyable pastime and an absorbing topic of conversation. For this type of recreational purpose the Stelladisk can be utilized as a parlor game. And for those who desire an interesting conversation piece, the Stelladisk can be constructed as an ornament which serves as a valuable memento of birthdays and other important events.

FIG. I illustrates one mode of the Stelladisk for which a round disk is preferable. The V-shaped slots, 1, provide sockets into which the planetary units of FIG. III fit snugly. The zodiac house signs are indicated around the outer edges as at 2. 3 indicates a pin at the center of the Stelladisk which receives the center hole of the House Number Disk shown in FIG. II. The radii, 4, serve the purpose of indicating the 360° of the zodiac.

FIG. II shows the House Number Disk. As aforementioned, the hole, 5, fits over the center pin of the Stelladisk. The zodiac house numbers are indicated as at 6. The angular houses, i.e., the Ascendant, the Midheaven, the Descendant and the Nadir, are indicated by the four spokes of the House Number Disk.

FIG. III shows a topside view of the Planetary Units which have v-shaped shanks that fit into the v-shaped slots of the Stelladisk.

The Stelladisk is a device for erecting the details of a horoscope, that is, the placement of the planets, the luminaries, and the house cusps in relationship to the zodiac at a particular moment in time. After erection of the horoscope on the Stelladisk, simply by affixing the planetary units and house number disk thereto, aspects between the planets and luminaries can be studied at length and at leisure. By means of several Stelladisks, the charts of several individuals, nations, animals, or any combination of horoscopes, can be followed day by day. And if a closer comparison of two horoscopes is desired than is possible with the Stelladisks in a side-by-side position, a transparent Stellaisk can be erected and mounted over another Stelladisk.

Because of the extreme variability of the various planetary positions in horoscopes and the fact that several planets are often located in the same area of the zodiac, it is preferable that the planetary units be separate units rather than attached to the center of the Stelladisk by means of spokes. For the same reason several circlets of v-shaped slots, rather than one alone, are desirable, to allow for a lineup of planetary units on successive circlets in the case of multiple conjunctions.

It is likewise preferable to have a separate House Number Disk because the first house position is a variable factor in horoscopes, but the House Number Disk is not really necessary to the Stelladisk since many famous astrologers, such as Marc Edmund Jones, dispense with the house numbers altogether in the erection of horoscopes.

The Stelladisk can be manufactured from a wide variety of substances depending on the availability of materials, the personal taste, and the purpose for which it is intended. Plastic, aluminum, wood, ceramics, tin, gold, silver and other metals; canvas, and other fabrics; plasterboard and heavy paper are but a few of the possibilities. In applications constructed of less-durable materials such as plasterboard or canvas, self-adhesive planetary units are utilized instead of tongues for insertion.

In the case of Stelladisks made of durable materials, room may be provided on the Planetary Units to attach self-adhesive unprinted labels on which the exact degrees, minutes and zodiac sign can be written in for those who wish exact details. The same means, that is the use of self-adhesive labels may be used to document the degrees and minutes and sign of each house cusp in correcting house cusp signs which are irregular when another method other than the equal house system of astrology is being followed.

I claim the following:

1. A device for erecting horoscopes comprising a circular base disk provided on its upper surface with radii dividing said disk into twelve segments, zodiac house sign indicia disposed in and identifying each segment, and v-shaped slots disposed in circular arrays about the center of said disk, certain of said slots being disposed interiorly of said segments and certain of said slots being disposed along said radii; and a plurality of planetary disks each provided with planet indicia on their upper surfaces and v-shaped shanks extending from their lower surfaces, said shanks being sized to fit within said slots.

2. A device as defined in claim 1 further including a pin centrally located on the upper surface of said circular base disk, a house number disk having a centrally disposed aperture sized to fit over said pin, radii dividing said house number disk into a plurality of houses each identified by a house number, said house number disk further including angular house indicating spokes radiating from the periphery thereof.

3. A device as defined in claim 1 and further including a second circular base disk which is transparent and adapted to be mounted over said first base disk so two erected horoscopes can be compared.

4. A device as defined in claim 1 and further including a plurality of unprinted self-adhesive labels sized to be disposed on the upper surfaces of said planetary disks.

* * * * *